No. 658,404. Patented Sept. 25, 1900.
W. F. STIMPSON.
SCALE.
(Application filed Dec. 7, 1896.)
(No Model.)
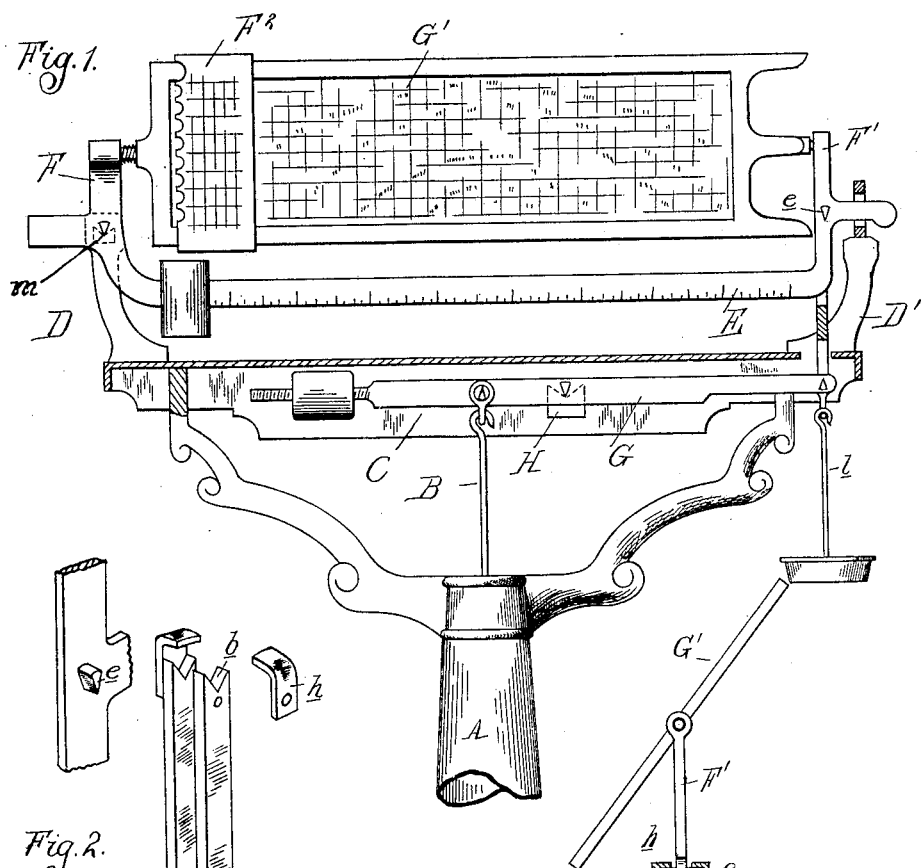
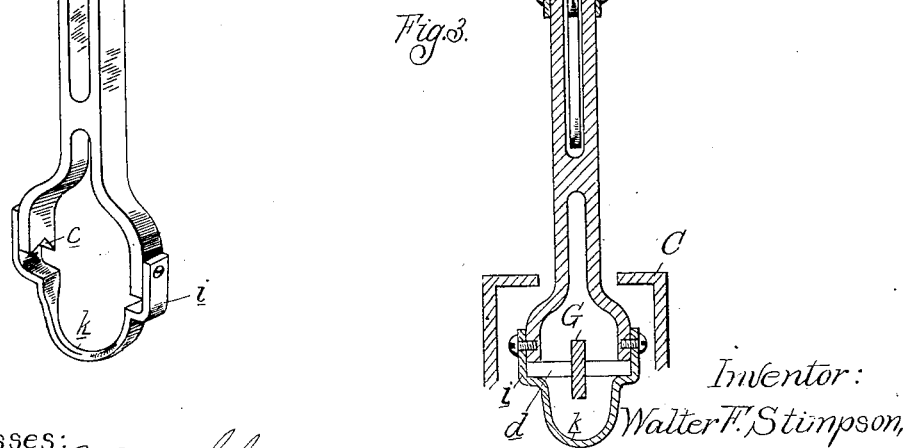
Witnesses:
Otto F. Barthel
MkDogherty.
Inventor:
Walter F. Stimpson,
By Mk Shaquet Co.
Attorneys.
THE NORRIS PETERS CO., PHOTO-LITHO., WASHINGTON, D. C.

UNITED STATES PATENT OFFICE.

WALTER F. STIMPSON, OF MILAN, MICHIGAN.

SCALE.

SPECIFICATION forming part of Letters Patent No. 658,404, dated September 25, 1900.

Application filed December 7, 1896. Serial No. 614,711. (No model.)

*To all whom it may concern:*

Be it known that I, WALTER F. STIMPSON, a citizen of the United States, residing at Milan, in the county of Monroe and State of Michigan, have invented certain new and useful Improvements in Scales, of which the following is a specification, reference being had therein to the accompanying drawings.

The invention relates to improvements in scales and particularly in the construction of the beam and the construction of the connections between that beam and the scale-levers, in the construction of such a scale as a computing or price scale, and in the construction, arrangement, and combination of the various parts, all as more fully hereinafter described.

In the drawings, Figure 1 is an elevation of a beam embodying my invention, showing, partly in section, the supporting-shelf and standard. Fig. 2 is a detached perspective of the link connecting the shelf-lever with the weighing beam or lever of the scale. Fig. 3 is a cross-section vertically through the beam on the line of this link.

The weighing-levers and platform may be of any desired construction. I have shown the standard and weighing-beam of a counter platform-scale, the platform and weighing-levers not being shown. A is the pillar thereof, and B is the "connecting-rod" or "beam-rod," so called, which connects the ends of the weighing-levers with the beam or shelf-lever. In scales of this kind it has been customary to use levers of the first class for the scale-beam.

In the use of such scales as computing-scales the scale-beam has been provided with extensions, which were both on one side of the fulcrum, and these extensions supported a computing member, rotary or stationary. To obtain a long computing member, thereby adding to the legibility of the figures and increasing the capacity of such computing-scales in the range of weights and prices, the extensions for the support of the computing member were made on opposite sides of the fulcrum and the computing member thus extended on both sides of such fulcrum. This construction was found to have more or less difficulties and objections, and my present improvement was devised to overcome the same and at the same time reduce the expense of manufacture and make the scale quicker in its movements and more symmetrical in its appearance.

C is a shelf at the top of the standard. D and D' are extensions or brackets on opposite ends of this shelf. E is a beam, which in this case is shown as a tare-beam, but which may be the weighing-beam or may be a beam simply to support a computing member, or in the event that the computing member does not turn it may be the computing member itself. This beam is a lever of the second class—that is, the poise (which represents the weight) is between the fulcrum and the power—that is, the connection to the scale-levers. The beam is shown as provided with end extensions F F', in which is pivoted a computing member G', having any desired number of computations thereon and having a sliding poise $F^2$, which in this case is used for weighing as well as indicating the price per pound. The poise carries the price per pound opposite each row of prices on the reversible plate, which in this case forms the computing member. Beneath the shelf is the lever G, to one end of which the beam-rod B connects, and the other end connects to the outer end or free end portion of the beam, being fulcrumed on the block H on the shelf. The connecting-rod between the lever G and the beam is shown in detail in Figs. 2 and 3 and has at opposite ends the opposite pivot-bearings *b c*, being double or bifurcated to give bearing on both sides.

*d* and *e* are oppositely-arranged pivots in the lever and beam engaging with these bearings on the connecting-rod.

*h* are caps for the upper bearing, and *i* is a cap for the lower bearing, having the bend *k*, which forms a loop by which to suspend the counterpoise *l*.

The fulcrum-pivot *m* of the beam may be and preferably is in the upward extension on the beam E and at such a point as to be on the line of the center of gravity of the beam as a whole. The connecting-pivot *e* at the opposite end is likewise preferably in the extension and in the same line. This enables me to dispense with any counterbalance-poise for this upper beam to properly locate the center of gravity of the beam, and therefore greatly lightens the beam, which makes it quicker and more sensitive in its movement, and also enables me to make it much more compact and symmetrical.

The use of the scale is obvious and requires no further description to any one familiar with scales.

What I claim as my invention is—

1. In a scale, the beam formed of a lever of the second class, a shelf-lever below the beam, a connection at one end of said shelf-lever to the scale-platform, and at the other end a rigid connecting rod or link, connecting the beam and shelf-lever, oppositely-arranged bearings in the ends of said link, oppositely-disposed pivots in the lever and beam with which said bearings engage and a rotary computing member supported in said beam.

2. In a scale, the combination with the supporting-standard, a shelf or cap thereon, an intermediate or shelf lever fulcrumed below said cap, a connection from one end thereof to the scale-levers, a beam fulcrumed at its end on the cap or shelf, and a rigid connection from the other end of the beam to the shelf-lever.

3. In a scale, a cap or shelf, a beam above the shelf, upward end extensions thereon, the fulcrum-pivot in one of said end extensions, a lever below the cap connected to the scale-levers at one end, a rigid link connecting said lever at the other end to the beam, and a computing member supported in said extensions.

4. In a scale, a cap or shelf, a beam above the shelf, upwardly-extending extensions thereon the fulcrum-pivot in one of said extensions, a connecting-pivot in the other extension, a lever below the cap connected to the scale-levers, a rigid upstanding link connecting the lever to the connecting-pivot in the extension, and a rotatable weighing and computing member pivoted in said extensions.

5. In a scale, the combination with the lever G, and beam E of the connecting-link between the lever and beam, consisting of a rigid member, bifurcated to embrace the ends of both beam and lever, and oppositely-arranged bearings in the ends of the bifurcations, engaging oppositely-arranged pivots in the beam and lever.

In testimony whereof I affix my signature in presence of two witnesses.

WALTER F. STIMPSON.

Witnesses:
CHARLES GUNNTLETT,
MILTON H. HACK.